United States Patent [19]
Fort

[11] Patent Number: 6,058,442
[45] Date of Patent: May 2, 2000

[54] COMPUTER SYSTEM HAVING REVERSIBLE BUS CONNECTORS

[75] Inventor: Philippe Fort, Champagnier, France

[73] Assignee: Hewlett-Packard Company, Palo Alto, Calif.

[21] Appl. No.: 09/104,737

[22] Filed: Jun. 25, 1998

[30] Foreign Application Priority Data

Jun. 26, 1997 [EP] European Pat. Off. .............. 97410067
Oct. 7, 1997 [EP] European Pat. Off. .............. 97410109

[51] Int. Cl.[7] .............................. G06F 13/00; H01R 9/09; H01R 23/70
[52] U.S. Cl. ......................... 710/100; 710/102; 361/760; 361/785; 439/78
[58] Field of Search ..................................... 710/100, 102, 710/126, 131; 361/736, 686, 760, 785, 791; 439/79, 43, 46, 95, 55, 78; 307/38; 370/386

[56] References Cited

U.S. PATENT DOCUMENTS

| | | | |
|---|---|---|---|
| 4,836,791 | 6/1989 | Grabbe et al. .............................. | 439/79 |
| 5,327,326 | 7/1994 | Komoto et al. .......................... | 361/760 |
| 5,479,001 | 12/1995 | Kumar ................................. | 235/472.02 |
| 5,535,342 | 7/1996 | Taylor ..................................... | 710/127 |
| 5,555,510 | 9/1996 | Verseput et al. ......................... | 710/102 |

*Primary Examiner*—Gopal C. Ray
*Attorney, Agent, or Firm*—Ohlandt, Greele, Ruggiero & Perle

[57] ABSTRACT

A computer bus system is provided with at least two parallel bus lines and at least a first and a second connector, each connector including at least two bus terminals. Each is connected to a respective bus line, and at least one non-bus terminal is not connected to a bus line. The first connector is an image of the second connector, rotated through 180 degrees. This image rotation maps each bus terminal of the second connector to a respective bus terminal of the first connector, and maps a predetermined non-bus terminal of the second connector to a predetermined non-bus terminal of the first connector. The predetermined non-bus terminals of the two connectors are electrically connected. Also provided are circuit cards adapted to be used with such a bus, each card include switches that map the received signals according to the direction of the connectors. The overall arrangement allows staggered mounting of cards on the bus, shorter parallel bus lines, and more efficient cooling.

12 Claims, 4 Drawing Sheets

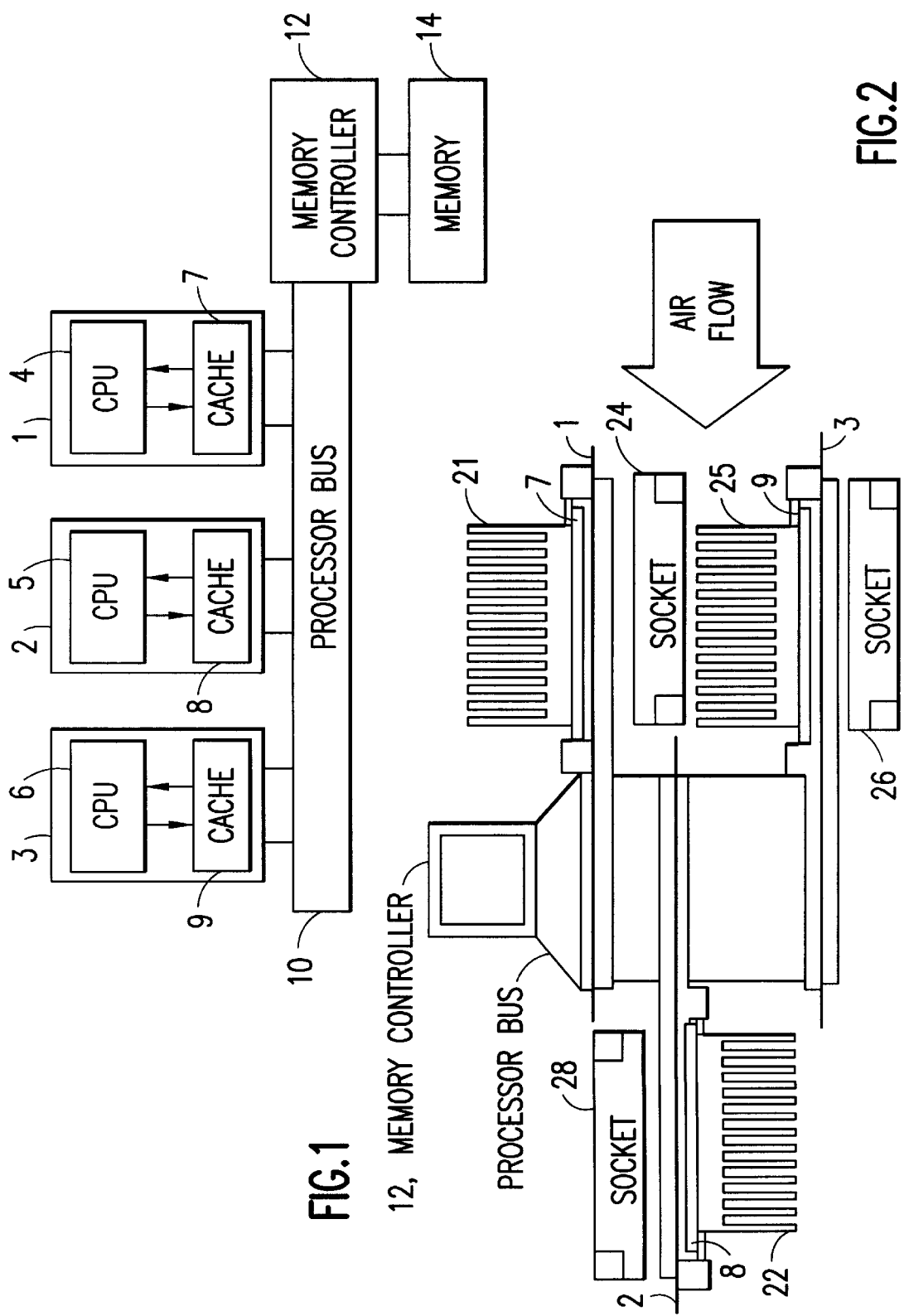

COMPUTER SYSTEM HAVING REVERSIBLE BUS CONNECTORS

FIELD OF THE INVENTION

The invention relates to the field of connectors, and notably to the field of connectors for computers. It notably applies to multiprocessor environments.

BACKGROUND OF THE INVENTION

The number of different types of printed circuits boards used for manufacturing a computer is increasing together with the requirement for advanced performance. The number of boards attached to a computer motherboard is thus increasing. This creates several types of problems. First, the physical size of computers increases, due to the number and volume of the different boards. Second, the number and length of signal lines on the motherboard increase; this creates routing problems and crosstalk. Third, the efficient cooling of the different boards is becoming increasingly complex and difficult to carry out.

These problems are notably encountered in multiprocessor environments. Computer performance is improving by using more and more sophisticated processors at high prices and/or by using complex implementations to gain a few percentage increase of bandwidth on DRAM or communication busses. It was therefore suggested to increase the number of processors running rather than increasing processor computation speed in order to greatly improve computer performance. Such a conventional multiprocessing system requires a large package and long signal lines. Further, since the multiprocessing system comprises a plurality of CPUs, it generates a large amount of heat compared to a single processing system.

FIG. 1 is a schematic view of such a multiprocessor system, exemplified with three different processors. The multiprocessor system of FIG. 1, comprises three processor printed circuit boards or cards 1, 2, 3, each of which includes a CPU 4, 5, 6 and a cache memory 7, 8 or 9. Each processor circuit board is connected to a common processor bus 10. The common processor bus is also connected to a memory controller 12; this controller is connected to a memory 14, e.g. a DRAM (Dynamic Random Access Memory). Each processor accesses memory 14 through the common processor bus 10 and the memory controller 12.

SUMMARY OF THE INVENTION

Accordingly, the purpose of the invention is to provide a solution to the problems discussed above, without further complicating the structure of the different boards.

According to the invention, there is provided a bus, having:
  at least two parallel bus lines,
  at least two connectors, each connector comprising at least two bus-terminals each connected to one bus line, and at least one terminal not connected to a bus line, wherein:
    one connector having a given pinout is the image of another connector having the same pinout in a rotation of 180 degrees,
    an image in the rotation of a bus-terminal of said one connector is a bus-terminal of said another connector, and
    a terminal of said one connector not connected to a bus line is electrically connected to the terminal of said another connector that is its image in the rotation.

Preferably, the image in the rotation of one given terminal having a given logic level is a terminal having an opposite logic level.

According to an embodiment of the invention, all terminals of a connector are on one side of the bus lines. The terminals may comprise power and ground terminals.

The invention also provides a circuit board, comprising:
  a connector with at least two connector terminals;
  switching means having connector-side terminals connected to said connector terminals, chip-side terminals, and a control input;
said switching means mapping the chip-side terminals to the connector-side terminals under control of said control input.

The control input is preferably connected to a connector terminal. The switching means may comprise two buffers, the terminals of each buffer being connected to the connector-side terminals and to the chip-side terminals, a signal received on said control input enabling either one of said two buffers.

The invention also covers a combination of a such computer board with a such circuit board.

It also provides a computer board with a bus having parallel bus lines and a least two identical connectors, and at least two identical circuit boards, each connected to one of said connectors, wherein one connector is the image of another connector in a rotation of 180 degrees, and wherein the circuit boards connected to said one connector and said another connector are relatively shifted or staggered.

Finally, the invention provides a process for routing signals on a motherboard to at least one circuit board connected in one connector of a series of identical connectors in alternate directions, comprising the steps of:
  routing the signals along parallel bus lines to the connectors, thus changing the mapping of the terminals of the connectors to the bus lines between connectors in alternate directions;
  switching the signals received on each circuit board according to the direction of the connector, so as to have an identical mapping of the switched signals to the bus lines, whatever the direction of the connector.

The direction of a connector may be determined in a circuit board according to the polarity of a given terminal of the circuit board connector; the step of switching preferably comprises:
  storing the signals in a first buffer, in a given order;
  storing the signals in a second buffer, in a different order; and
  reading the signals from one of said first and second buffers.

BRIEF DESCRIPTION OF THE DRAWINGS

A multiprocessor system embodying the invention will now be described, by way of non-limiting example, with reference to the accompanying drawings, in which FIG. 1 is a schematic view of a multiprocessor system;

FIG. 2 is a front view of the multiprocessor system according to the invention;

BEST MODE OF CARRYING OUT THE INVENTION

Figure 3:
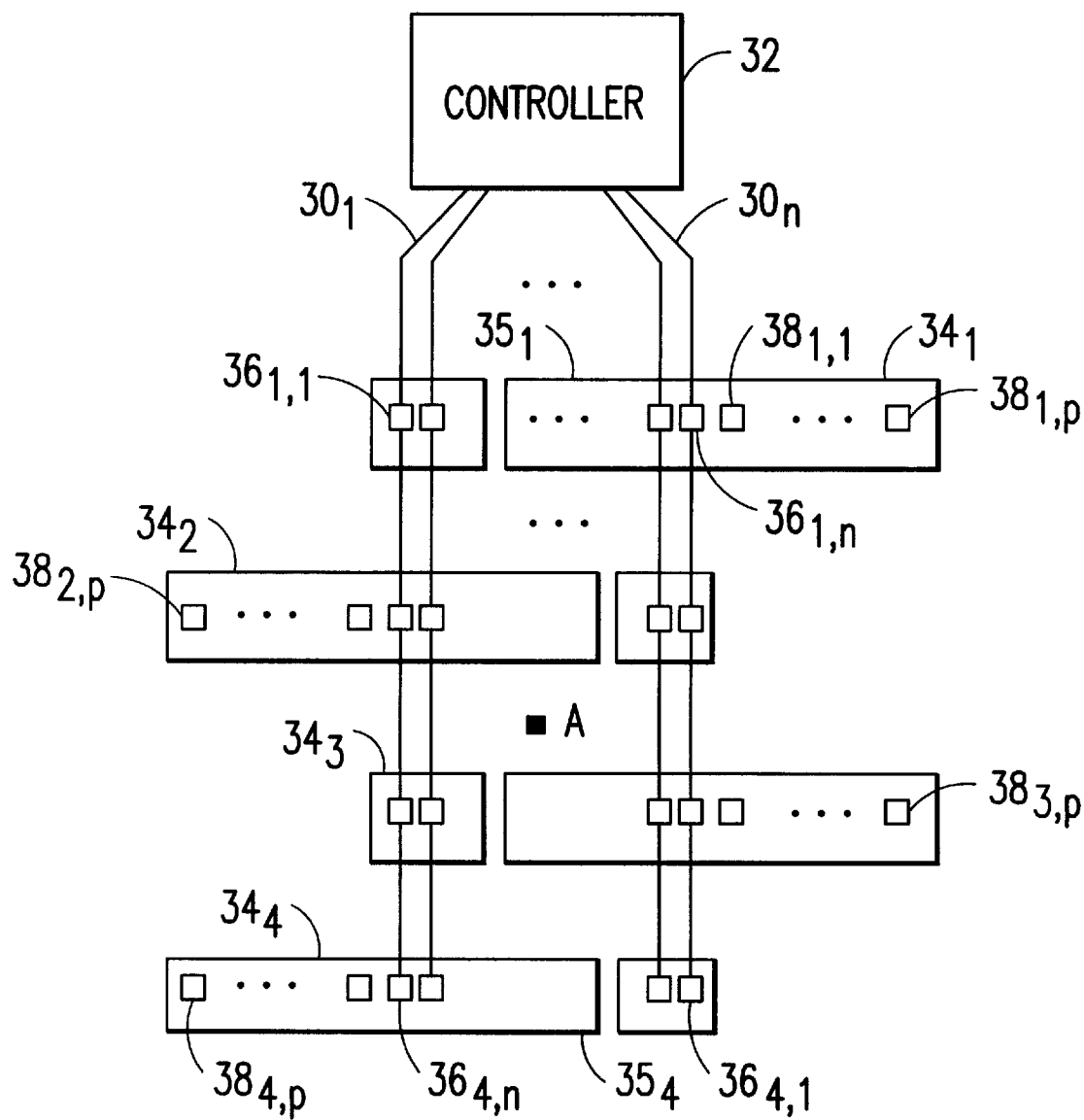
FIG. 3 is a view of a bus according to the invention.

FIG. 2 is a front view of the multiprocessor system according to the invention; the multiprocessor system of FIG. 2 comprises elements similar to those of FIG. 1 and bearing the same reference numbers. The memory controller 12 is connected to the processor bus 10. Each processor circuit board 1, 2 and 3 is connected to the processor bus 10, and is arranged to be perpendicular to the processor bus.

According to the invention, and as explained below in reference to FIGS. 3 to 6, the circuit boards may be arranged on one side or the other of the bus; it is therefore possible, as depicted in FIG. 1, to limit the space used by the different circuit boards, by arranging the boards alternately on each side of the bus. In the configuration exemplified on FIG. 2, the first circuit board 1 is arranged on the right side of the processor bus, with the processor 7 facing the memory controller. FIG. 2 also shows the cooling unit 21 of the processor. The second circuit board 2 is arranged on the left side of the processor bus, with the processor 8 and the cooling unit 22 facing away from the memory controller. The third circuit board 3 is arranged like the first one. Reference numeral 23 identifies the cooling unit of the processor 9 of the third circuit board. Thus, the overall space used by the processor circuit boards is limited, even though the same boards may be used. In other words, in the structure of FIG. 2, the computer board comprises a bus having parallel bus lines and three identical connectors, and three identical circuit boards, each connected to one of said connectors; each connector is the image of the adjacent connector in a rotation of 180 degrees, and the circuit boards connected to the adjacent connectors are relatively shifted.

In the configuration of FIG. 2, voltage regulator sockets 24, 26 and 28 for the different processor boards are arranged on alternate sides of the processor bus, on the same side as the corresponding processor circuit boards. The structure of FIG. 2 has the following advantages. The distance between the successive socket assemblies on the processor bus can be reduced, the length of the bus can be shortened, and, finally, a package size of the multiprocessing system can be minimised. Furthermore, bus lines routing is straightforward, and the lines can have large line insulation, which reduces crosstalk. The CPU dedicated voltage regulators can be provided very close to each CPU, and consequently, signal line length between each CPU and each CPU dedicated voltage regulator can be reduced. Therefore, the voltage drop between the two can be reduced. Furthermore, the successive circuit boards constitute channels for airflow, so that the cooling of the different processors and voltage regulators is more efficient.

The staggered structure described in reference to FIG. 2 may be used not only for processor boards, but for any type of boards. It is particularly useful for boards that have significant thickness on part of their surface—such as processor boards, which have a cooling unit installed on the processor.

FIG. 3 is a view of a bus assembly according to the invention. The bus of FIG. 3 comprise a series of bus lines $30_1$ to $30_n$, where n is the number of bus lines, e.g. n=64 in a usual computer configuration. These lines are parallel and are connected to a controller 32. The bus also comprises a series of connectors $34_1$ to $34_m$, where m is the number of connectors, e.g. m=4 for a multiprocessor configuration. The different connectors have the same pinout; however, a given connector $34_i$ is rotated through 180 degrees with respect to an adjacent connector $34_{i+1}$. FIG. 3 shows the centre of rotation A of the rotation that transforms connector $34_2$ into connector $34_3$ (and vice-versa). All connectors have the same pinout, and comprise a polarising key $35_i$ that mechanically distinguishes the direction of a connector.

Each connector comprises a series of bus-sockets $36_{i,j}$, where $1 \leq i \leq m$ and $1 \leq j \leq n$, each of which is connected to a different bus line. Each connector also comprises a series of sockets $38_{i,k}$, where $1 \leq i \leq m$ and $1 \leq j \leq p$, that are not connected to a bus line. These sockets may for instance comprise power supply sockets, ground sockets, identifying sockets for identifying each connector, a reset socket for separately resetting a card connected to a given connector, etc. These sockets may be arranged as shown in FIG. 3 on one side of the bus lines; they may also be arranged on both sides of the bus lines, according to the needs.

According to the invention, an image in the rotation of a bus-socket of one connector is a bus-socket of the adjacent connector. In other words, the image in the rotation of the assembly $\{36_{i,j}, 1 \leq j \leq n\}$ of all bus-sockets of connector i is the assembly $\{36_{i+1,k}, 1 \leq k \leq n\}$ of all bus-sockets of connector i+1. Since there is only one invariant point in a rotation, this means that there exists at least one bus-socket connected to a given bus line, the image of which is not connected to the same bus line. In the case depicted in FIG. 3, the image in the rotation of bus-socket $36_{i,j}$ is bus socket $36_{i+1,n+1-j}$: the image of a bus socket connected to a given bus line is therefore a bus-socket connected to a different bus-line.

On the other hand, a socket $38_{i,k}$ that is not connected to a bus line, and its image the image $38_{i+1,k}$ may very well be electrically connected, that is may have the same function, or be connected to the same line or plane of the board. This is indeed possible, since there is no constraint that the lines between all sockets not connected to the bus lines and their respective images be parallel.

In other words, according to the invention, in the rotation that transforms connector i into connector i+1:

each bus-socket is transformed into a bus socket connected to a different bus line;

each socket not connected to a bus line is transformed into a socket, to which it is electrically connected.

This means that the bus lines are parallel, and that the lines connecting the other sockets to their respective images are not parallel.

Figure 4:
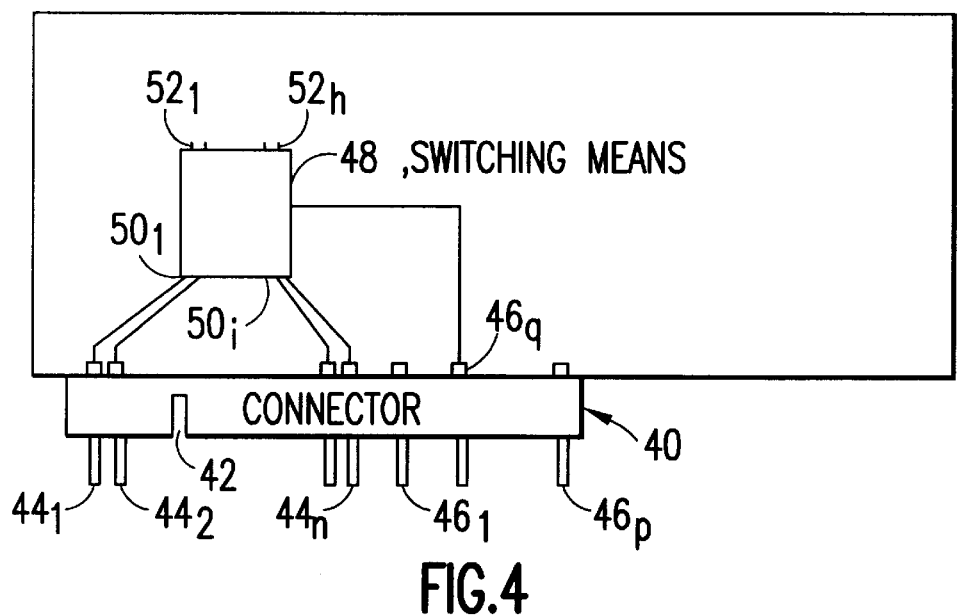
FIG. 4 is a view of a card according to the invention, in a first position.

The bus described in reference to FIG. 3 is adapted to provide the structure described in reference to FIG. 2, with the cards or circuit boards described below. FIG. 4 is a view of a card according to the invention; such a card comprises a connector adapted to be connected to a bus connector; in the exemplified embodiment, the connector 40 is a pin connector adapted to be connected to the socket connector of FIG. 3. Connector 40 thus comprises n+p pins, and a recess 42 corresponding to the polarising key 35 of the socket connector. Out of the n+p pins, n bus pins, say bus pins $44_h$, $1 \leq h \leq n$ are connected to the bus sockets 36 when the connector 40 is connected to the socket connector. The p other pins, say pins $46_h$, $1 \leq h \leq p$ are connected to the sockets 38 when the connector 40 is connected to the socket connector.

The card of FIG. 4 may be connected to any one of the socket connectors of FIG. 3, and thus, one given bus pin $44_h$, $1 \leq i \leq n$ may be connected to different bus lines, according to the socket connector in which the card is inserted. In the example of FIG. 3, bus pin $44_h$ would be connected to bus socket $36_h$, and thus to bus line $30_h$ or $30_{n+1-h}$, according to the socket connector. On the other hand, the pins $46_h$, $1 \leq i \leq p$ of the card are connected to the same logical or electrical signal, whatever the connector into which the card is plugged.

In order to ensure proper operation of the card, whatever the socket connector into which it is plugged, the card comprises also switching means 48. The connector-side terminals $50_h$ of the switching means are connected to the $44_h$ of the connector, and the chip-side terminals $52_h$ of the switching means 48 provide signals that may be used in the card, e.g. in a microprocessor chip. The switching means ensure that whatever the connector into which the card is plugged, the chip-side terminals of the switching means are correctly mapped to the bus lines. In other words, the switching means ensure that for any value h, $1 \leq h \leq n$, the chip-side terminal $52_h$ of the switching means 48 are connected or mapped on the bus line $30_h$.

Thus, the card according to the invention may be plugged in any connector of the bus described in reference to FIG. 3: the switching means will in any case ensure a correct mapping of the chip terminals to the bus lines.

In the example given above, in a first connector $34_i$, socket $36_j$ is connected to bus line $30_j$; socket $36_j$ is connected to bus pin $44_j$, that is connected to connector-side terminal $50_j$; the switching means ensure that chip-side terminal $52_j$ is directly connected to connector-side terminal $50_j$. On the other hand, in a connector $34_{i+1}$ arranged in the opposite direction, $36_j$ is connected to bus line $30_{n+1-j}$; socket $36_j$ is connected to bus pin $44_j$, that is connected to connector-side terminal $50_j$; the switching means ensure that chip-side terminal $52_{n+1-j}$ is connected to connector-side terminal $50_j$. Thus, chip-side terminal $52_{n+1-j}$ is correctly mapped to bus line $30_{n+1-j}$.

Figure 5:
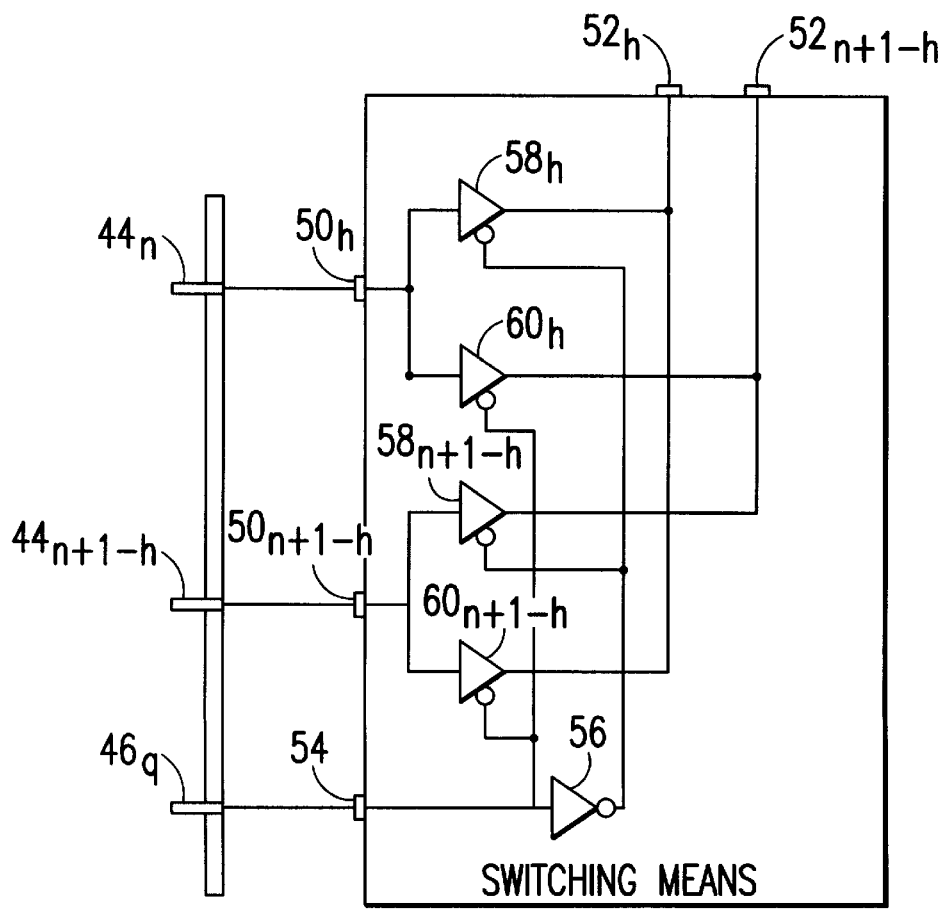
FIG. 5 is a view of the switching means of the card of FIG. 4.

Switching means may be embodied and controlled in a plurality of ways. FIG. 5 is a view of a possible embodiment of the switching means. The switching means are controlled by the signal received on a given pin of the connector 40, say pin $46_q$. Sockets $38_q$ and $38_{n+1-q}$ are respectively connected to opposite logical levels, say level "0" for socket $38_q$, and level "1" for socket $38_{n+-q}$. In the case of a connector in a first direction, say connector $34_1$ in the example of FIG. 3, pin $46_q$ is connected to socket $38_q$, that is to "0"; thus, the switching means 48 receive a control signal that is a logical "0". In the case of a connector in the opposite direction, say connector $34_2$ in the example of FIG. 3, pin $46_q$ is connected to socket $38_{n+1+q}$; thus, the switching means 48 receive a control signal that is a logical "1". This clearly makes it possible to command the switching means, according to the direction of the connector into which the card is plugged. Obviously, the switching means may be integrated in a chip, if necessary.

FIG. 5 simply shows how the switching means may, under control of the signal received on pin $46_q$, switch the connector-side terminal $50_h$ either to chip-side terminal $52_h$ or to chip-side terminal $52_{n+1-h}$, and respectively, terminal $50_{n+1-h}$ either to chip-side terminal $52_{n+1-h}$ or to chip-side terminal $52_h$. As depicted on FIG. 5, pin connector $44_h$ is connected to connector-side terminal $50_h$, and pin connector $44_{n+1-h}$ is connected to connector-side terminal $50_{n+1-h}$. The control signal received on pin $46_q$ is transmitted to a control input terminal 54. The signal received on control input terminal 54 is provided to an inverter 56.

The signal received on connector-side terminal $50_h$ (respectively $50_{n+1-h}$) is provided to two buffers $58_h$ and $60_h$ (respectively $58_{n+1-h}$ and $60_{n+1-h}$). The outputs of buffers $58_h$ and $60_{n+1-h}$ are connected to chip-side terminal $52_h$; the outputs of buffers $58_{n+1-h}$ and $60_h$ are connected to chip-side terminal $52_{n+1-h}$. Buffers $58_h$ and $58_{n+1-h}$ are enabled by the signal provided on control input terminal 54, whereas buffers $60_h$ and $60_{n+1-h}$ are enabled by the signal output by inverter 56. The operation of the switching means of FIG. 5 is clear.

In the embodiment of FIG. 5, the switching means are operating in one direction only. They may be duplicated in order to ensure routing of the signals to and from the card; one may also provide other embodiments, e.g. a bidirectional buffer, or a switch. In the embodiment of FIG. 5, the signals of two sockets are used in order to control the switching means; there are other ways to control the switching means, e.g. two different pins of the connector 40 may be used, one pin only being connected to a given logical level, according to the direction of the connector.

Figure 6:
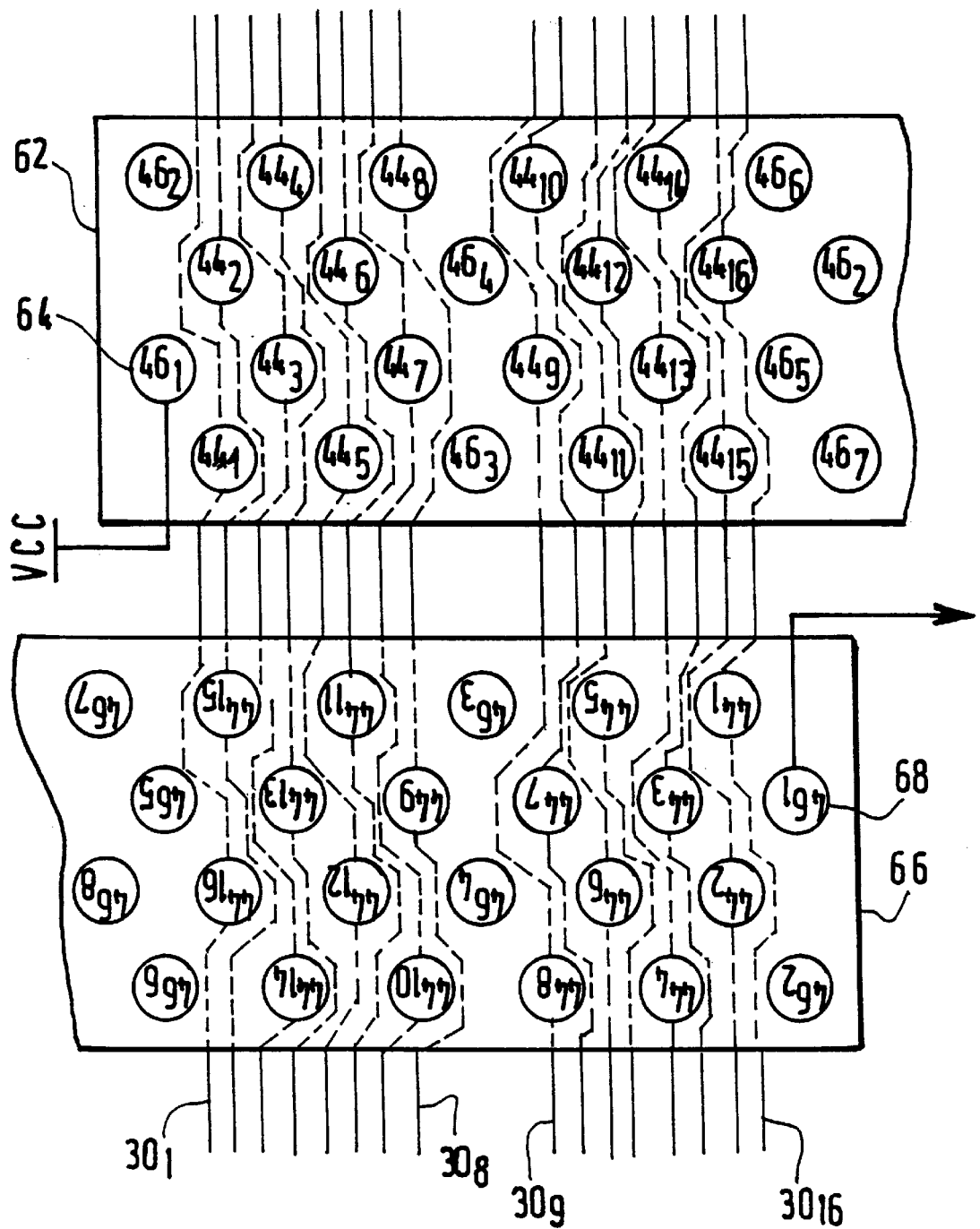
FIG. 6 is a view of a possible connector pinout.

FIG. 6 is a view of a possible connector pinout, according to the invention. FIG. 6 shows the bus lines $30_1$ to $30_{16}$, a first card connector 62, with a control pin 64, corresponding to pinout $46_1$, and a second connector 66, with a control pin 68, corresponding to pinout $46_1$. As shown on FIG. 6, control pin 64 is connected to VCC, whereas control pin 68 is connected to ground, so as to ensure a correct mapping of the chip-side terminal of the switching means to the bus lines.

It is clear that the scope of invention not only covers the example described in reference to FIG. 3, where each connector is the image of an adjacent connector after a rotation through 180 degrees, but also other configurations, where some of the connectors are arranged in the same direction as the adjacent connectors: it is sufficient that at least one connector is the image of an adjacent connector in a rotation of 180 degrees. For instance, the scope of the invention covers the configuration where two connectors are arranged on one side of the bus lines, and where the two next connectors are arranged on the other side of the bus lines. It is also not necessary that all connectors have exactly the same pinout. One could imagine that two different types of connectors are provided on a given bus. The invention is also not limited to the exemplified pinout of the preferred embodiments described above.

Also, the invention was described above in the usual configuration where the bus connectors are socket connectors, and the circuit boards connectors are pin connector. It should be understood that the invention is not limited to this configuration, and that the usual types of edge connectors provided in the computer industry may also be used. The words "connector terminal" thus notably cover pins, sockets, edge lands and spring terminals adapted to mate with such lands.

Furthermore, it is clear for the person skilled in the art that the bus lines of the invention are parallel in that they do not intersect. This is the proper meaning in the invention of the word parallel; it is not necessary that the bus lines are "parallel" in the mathematical meaning of this word to ensure the advantages of the invention.

I claim:

1. A bus, having:
   at least two parallel bus lines, and
   at least a first and a second connector having a same pinout, each connector having a plurality of terminals extending generally along a first direction, the plurality of terminals comprising at least two bus-terminals each connected to one bus line, and at least one non-bus terminal not connected to a bus line,
   wherein the first connector is an image of the second connector, rotated through 180 degrees about an axis perpendicular to the first direction, with this image rotation mapping each bus terminal of the second connector to a respective bus terminal of the first connector, and mapping a predetermined non-bus terminal of the second connector to a predetermined non-bus terminal of the first connector, said predetermined non-bus terminals being electrically connected.

2. A bus according to claim 1, wherein the image in the rotation of one given terminal having a given logic level is a terminal having an opposite logic level.

3. A bus according to claim 1 wherein all terminals of a connector are on one side of the bus lines.

4. A computer board comprising a bus according to claim 1, said at least on non-bus terminal of each connector comprising power and ground terminals.

5. A circuit board, comprising a connector with at least two connector terminals; and a switching arrangement having connector-side terminals connected to said connector terminals, chip-side terminals, and a control input;

said switching arrangement mapping the chip-side terminals to the connector-side terminals under control of said control input.

6. A circuit board according to claim 5, wherein said control input is connected to a connector terminal.

7. A circuit board according to claim 5, wherein said switching arrangement comprise two buffers, the terminals of each buffer being connected to the connector-side terminals and to the chip-side terminals, a signal received on said control input enabling either one of said two buffers.

8. A combination of a computer board and a circuit board, the computer board comprising a bus, the bus having:

at least two parallel bus lines, at least a first and a second connector having the same pinout, each connector comprising at least two bus-terminals each connected to one bus line, and at least one non-bus terminal not connected to a bus line, wherein the first connector is the image rotated through 180 degrees of the second connector with this image rotation mapping each bus terminal of the second connector to a respective bus terminal of the first connector, and mapping a predetermined non-bus terminal of the second connector to a predetermined non-bus terminal of the first connector, said predetermined non-bus terminals being electrically connected, said at least one non-bus terminal of each connector comprising power and ground terminals, the circuit board comprising:

a connector with at least two connector terminals; and a switching arrangement having connector-side terminals connected to said connector terminals, chip-side terminals, and a control input;

said switching arrangement mapping the chip-side terminals to the connector-side terminals under control of said control input.

9. A computer board with a bus having parallel bus lines and a least two identical connectors, each connector having a plurality of terminals extending generally along a first direction, and at least two identical circuit boards, each connected to one of said connectors, wherein one connector is the image of another connector rotated through 180 degrees about an axis that is perpendicular to the first direction, and wherein the circuit boards connected to said one connector and said another connector are relatively shifted in a direction perpendicular to the first direction and perpendicular to the axis of rotation.

10. A process for routing signals on a motherboard to at least one circuit board connected in one connector of a series of identical connectors in alternate directions, each connector having a plurality of terminals extending in spaced relation generally along a first direction, adjacent connectors being the image of neighboring connectors, rotated through 180 degrees about an axis perpendicular to the first direction, the method comprising the steps of:

routing the signals along parallel bus lines to the connectors, thus changing the mapping of the terminals of the connectors to the bus lines between connectors in alternate directions; and switching the signals received on each circuit board according to the direction of the connector, so as to have an identical mapping of the switched signals to the bus lines, whatever the direction of the connector.

11. process according to claim 10, wherein the direction of a connector is determined in a circuit board according to the polarity of a given terminal of the circuit board connector.

12. A process according to claim 10, wherein the step of switching comprises:

storing the signals in a first buffer, in a given order;

storing the signals in a second buffer, in a different order; and reading the signals from one of said first and second buffers.

* * * * *

UNITED STATES PATENT AND TRADEMARK OFFICE
CERTIFICATE OF CORRECTION

PATENT NO. : 6,058,442
APPLICATION NO. : 09/104737
DATED : May 2, 2000
INVENTOR(S) : Philippe Fort It is certified that error appears in the above-identified patent and that said Letters Patent is hereby corrected as shown below:

Claim 5, Column 7, line 6, after "comprising" insert --:--

Claim 11, Column 8, line 30, before "process" insert --A--

Signed and Sealed this

Twenty-first Day of October, 2008

JON W. DUDAS
*Director of the United States Patent and Trademark Office*